United States Patent
Yamamoto et al.

(10) Patent No.: US 8,540,917 B2
(45) Date of Patent: Sep. 24, 2013

(54) INSERT MOLDING METHOD AND INSERT MOLDED PRODUCT

(75) Inventors: Satoshi Yamamoto, Hitachi (JP);
Akihiro Tanba, Hitachinaka (JP);
Masafumi Kaga, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 306 days.

(21) Appl. No.: 12/926,639

(22) Filed: Dec. 1, 2010

(65) Prior Publication Data
US 2011/0143111 A1 Jun. 16, 2011

(30) Foreign Application Priority Data

Dec. 16, 2009 (JP) .................................. 2009-285468

(51) Int. Cl.
*B29C 45/14* (2006.01)
(52) U.S. Cl.
USPC ........... 264/261; 264/275; 264/277; 264/318; 264/328.7; 264/272.15; 425/125; 425/127; 425/577
(58) Field of Classification Search
USPC ......... 264/261, 275, 277, 318, 328.7, 272.15; 425/125, 127, 577
See application file for complete search history.

(56) References Cited

U.S. PATENT DOCUMENTS

| | | | | |
|---|---|---|---|---|
| 5,449,480 A | * | 9/1995 | Kuriya et al. | 264/112 |
| 5,527,502 A | * | 6/1996 | Kiuchi et al. | 264/250 |
| 5,926,952 A | * | 7/1999 | Ito | 29/883 |
| 6,019,928 A | * | 2/2000 | Fujitani et al. | 264/263 |
| 6,045,739 A | * | 4/2000 | Abe | 264/277 |
| 6,063,321 A | * | 5/2000 | Koyama et al. | 264/404 |
| 6,071,446 A | * | 6/2000 | O'Brien et al. | 264/46.5 |
| 6,273,700 B1 | * | 8/2001 | Takahashi | 425/123 |
| 6,363,085 B1 | * | 3/2002 | Samuels | 370/502 |
| 6,527,989 B1 | * | 3/2003 | Onoda | 264/40.1 |
| 6,664,478 B2 | * | 12/2003 | Mohan et al. | 174/149 B |
| 2003/0072912 A1 | * | 4/2003 | Itoh et al. | 428/99 |
| 2007/0031646 A1 | | 2/2007 | Yamazaki et al. | |
| 2010/0206468 A1 | | 8/2010 | Yamazaki et al. | |

FOREIGN PATENT DOCUMENTS

| | | |
|---|---|---|
| JP | 2007-38490 A | 2/2007 |
| JP | 2007-215340 A | 8/2007 |

* cited by examiner

*Primary Examiner* — Monica Huson
*Assistant Examiner* — Saeed Huda
(74) *Attorney, Agent, or Firm* — McGinn IP Law Group, PLLC

(57) ABSTRACT

An insert molding method includes holding a plurality of insert members in a molding die to be separated from one another, and subsequently filling a resin into the molding die to fill a gap between the insert members and a periphery thereof with the resin to form an insert molded product such that the insert members are separated at a preset interval from one another. The molding die includes a space-maintaining projection for maintaining a separation interval between the insert members at the preset interval or more, the projection being formed on an inner wall surface of the molding die opposite to a longitudinal end of the insert members, and a gate for filling the resin therethrough into the molding die, the gate being formed on an inner wall surface of the molding die opposite to a side of the insert members in a width direction thereof.

4 Claims, 18 Drawing Sheets

1 INSERT MOLDED PRODUCT
2a,2b BUS BAR
3 RESIN MOLDED BODY
4 WELD LINE

| 5 MOLDING DIE |
| 6 HOLDING GROOVE |
| 7 PROJECTION |
| 8 GATE |

| 2a,2b BUS BAR | 7 PROJECTION |
| 4 WELD LINE | 8 GATE |
| 5 MOLDING DIE | 9 INSULATING RESIN |

| 2a,2b BUS BAR | 8 GATE |
| --- | --- |
| 4 WELD LINE | 9 INSULATING RESIN |
| 5 MOLDING DIE | 10 SUPPORTING MEMBER |
| 7 PROJECTION | |

| 2a,2b BUS BAR | 8 GATE |
|---|---|
| 4 WELD LINE | 9 INSULATING RESIN |
| 5 MOLDING DIE | 10 SUPPORTING MEMBER |
| 7 PROJECTION | |

| 2a,2b BUS BAR | 8 GATE |
| 4 WELD LINE | 9 INSULATING RESIN |
| 5 MOLDING DIE | 10 SUPPORTING MEMBER |
| 7 PROJECTION | |

| 2a,2b BUS BAR | 8 GATE |
| 4 WELD LINE | 9 INSULATING RESIN |
| 5 MOLDING DIE | 11 PUSH BAR |
| 7 PROJECTION | |

| 2a,2b BUS BAR | 8 GATE |
| 4 WELD LINE | 9 INSULATING RESIN |
| 5 MOLDING DIE | 14 APPROACH PREVENTION PIN |
| 7 PROJECTION | |

INSERT MOLDING METHOD AND INSERT MOLDED PRODUCT

The present application is based on Japanese Patent Application No. 2009-285468 filed on Dec. 16, 2009, the entire contents of which are incorporated herein by reference.

BACKGROUND OF THE INVENTION

1. Field of the Invention

The invention relates to an insert molding method that a gap between plural insert members and peripheries thereof are simultaneously filled with a resin by insert molding, and to an insert molded product.

2. Description of the Related Art

An insert molded product formed by simultaneously filling a gap between plural insert members and peripheries thereof with a resin includes, e.g., a molded product formed by laminating bus bars with narrow gaps and then simultaneously filling a gap between the bus bars and a periphery thereof with an insulating resin in order to electrically insulate the bus bars from each other.

The bus bars are separately held in a molding die, the insulating resin is subsequently filled into the molding die such that the gap between the plural insert members and the peripheries are simultaneously filled, and the insert molded product is then demolded from the molding die.

The insert molded product thus obtained may be used in, e.g., a high electric field (e.g., about 4 kV/mm) environment such as an inverter circuit for a vehicle, where it needs to provide excellent electrical insulation resistant to the high electric field environment.

Related arts to the invention are, e.g., JP-A-2007-215340 and JP-A-2007-38490.

SUMMARY OF THE INVENTION

However, in the conventional insert molding method, the laminated (separately held) bus bars may be pushed by the resin filled into the molding die during the molding such that they are deformed by the molding.

This may cause a problem that the expected electrical insulation cannot be obtained due to a change in the lamination interval between the bus bars that may decrease or increase, so that it is impossible to ensure reliability.

Therefore, it is an object of the invention to provide an insert molding method that can prevent deformation of bus bars during the molding.

(1) According to one embodiment of the invention, an insert molding method comprises:

holding a plurality of insert members in a molding die to be separated from one another; and subsequently filling a resin into the molding die to fill a gap between the plurality of insert members and a periphery thereof with the resin to form an insert molded product such that the plurality of insert members are separated at a preset interval from one another, wherein the molding die comprises a space-maintaining projection for maintaining a separation interval between the plurality of insert members at the preset interval or more, the projection being formed on an inner wall surface of the molding die opposite to a longitudinal end of the plurality of insert members, and a gate for filling the resin therethrough into the molding die, the gate being formed on an inner wall surface of the molding die opposite to a side of the plurality of insert members in a width direction thereof, wherein the plurality of insert members are held in the molding die such that the separation interval is allowed to change and to be more than the preset interval while sandwiching the projection, and wherein the resin is filled through the gate into the gap between the plurality of insert members such that the resin subsequently penetrates into an inner rim portion of the molding die, and the end of the plurality of insert members is pressed against the projection by resin pressure of the penetrating resin to form the insert molded product.

In the above embodiment (1) of the invention, the following modifications and changes can be made.

(i) The molding die further comprises a wide holding groove for holding the plurality of insert members on the inner wall surface, and the projection is formed near a center of a bottom of the holding groove.

(ii) The molding die further comprises a supporting member to contact the plurality of insert members along a length direction thereof while being inserted into the molding die, and the supporting member is separated from the plurality of insert members not to disturb the penetration of the resin when the resin penetrates into the inner rim portion of the molding die.

(iii) The molding die further comprises an approach preventing means to prevent an interval between the plurality of insert members along a length direction thereof from being less than the preset interval.

(iv) The molding die further comprises a push bar to be inserted into the molding die to contact the plurality of insert members, and the push bar is pushed in so as to supplement the resin pressure for reducing the gap between the plurality of insert members when the resin penetrates into the inner rim portion of the molding die.

(2) According to another embodiment of the invention, an insert molded product formed by the insert molding method according to the embodiment (1) is provided, wherein a weld line is not formed between the plurality of insert members.

In the above embodiment (2) of the invention, the following modifications and changes can be made.

(v) A inner resin layer formed between the plurality of insert members is thicker than an outer resin layer formed on the periphery of the plurality of insert members.

Points of the Invention

According to one embodiment of the invention, an insert molding method is devised such that, when filling with an insulating resin, bus bars can move over the whole length by pressure of the filed resin. Hence, since pressure difference that may cause deformation of the bus bars is not generated during the molding, it is possible to prevent the deformation of the bus bars so as to carry out the molding while the bus bars are separated from one another at a preset interval over the whole length. Thereby, an insert molded product can be obtained that is excellent in electrical insulation and reliability.

BRIEF DESCRIPTION OF THE DRAWINGS

Next, the present invention will be explained in more detail in conjunction with appended drawings, wherein:

FIG. 1 are views showing an insert molded product in a first embodiment of the present invention, wherein

FIG. 3 are views showing an example of a molding die used for forming the insert molded product of FIG. 1, wherein

FIG. 4 are views showing the molding die of FIG. 3 when the bus bars of FIG. 2 are held, wherein

FIG. 8 are views showing a molding die in a second embodiment of the invention, wherein

FIG. 11 are views showing a molding die in a third embodiment of the invention, wherein

FIG. 14 are views showing a molding die in a fourth embodiment of the invention, wherein

FIG. 17 are views showing a molding die in a fifth embodiment of the invention, wherein

FIG. 20 are views showing an insert molded product in a sixth embodiment of the invention, wherein FIG. 2C is a cross sectional view taken on line Cn-Cn (horizontal cross sectional view) and FIG. 20D is a cross sectional view taken on line D-D (vertical cross sectional view);

FIG. 21 are views showing the molding die used for the insert molded product of FIG. 20, wherein

DETAILED DESCRIPTION OF THE PREFERRED EMBODIMENTS

A preferred embodiment of the invention will be described below in conjunction with the appended drawings.

First Embodiment

Without Supporting Member

Figure 1A:
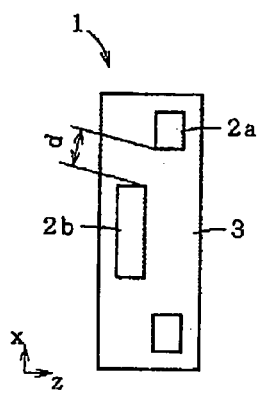
FIG. 1A is a side view.
Figure 1B:
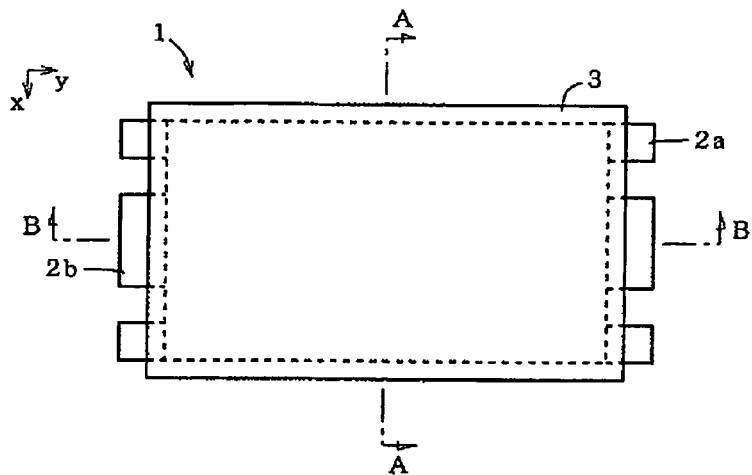
FIG. 1B is a plan view.
Figure 1C:
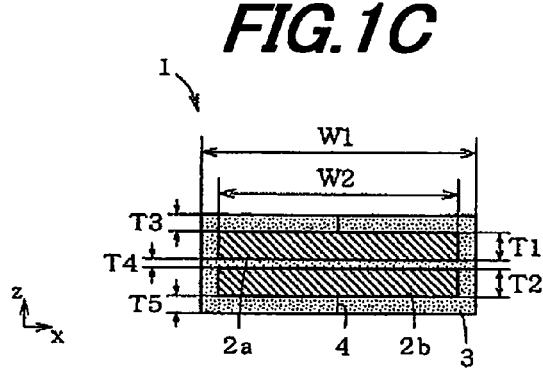
FIG. 1C is a cross sectional view taken on line A-A (horizontal cross sectional view) and FIG. 1D is a cross sectional view taken on line B-B (vertical cross sectional view)
Figure 1D:
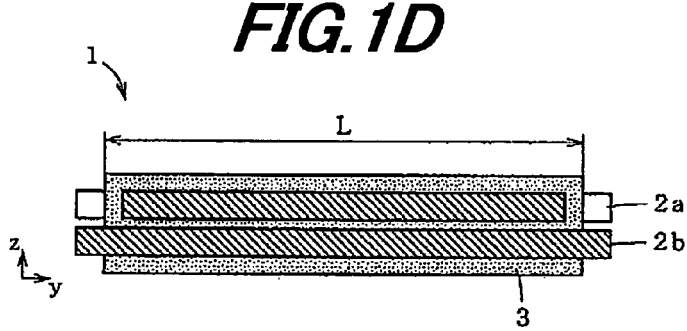

FIG. 1 are views showing an insert molded product in a first embodiment of the invention, wherein FIG. 1A is a side view, FIG. 1B is a plan view, FIG. 1C is a cross sectional view taken on line A-A (horizontal cross sectional view) and FIG. 1D is a cross sectional view taken on line B-B (vertical cross sectional view).

As shown in FIG. 1, an insert molded product 1 in the first embodiment is composed of bus bars (conductors) $2a$ and $2b$ as plural (two in the drawing) inset members separately arranged at a set interval, and a resin molded body 3 for covering the gap between the bus bars $2a$ and $2b$ as well as the periphery thereof. Here, the set interval is a distance by which electrical insulation between the bus bars $2a$ and $2b$ is well maintained, and which is a design matter naturally taken into consideration for forming the insert molded product 1.

In FIG. 1, T1 and T2 respectively denote thicknesses of the bus bars $2a$ and $2b$, T3 and T5 denote a thickness of a resin layer on the periphery of the bus bars $2a$ and $2b$ (a gap between the bus bars $2a$, $2b$ and an inner wall surface of a below-described molding die 5), T4 denotes a thickness of a resin layer between the bus bars $2a$ and $2b$ (a separation interval between the bus bars $2a$ and $2b$), W1 denotes a width of the resin molded body 3, W2 denotes a width of the bus bars $2a$ and $2b$ and L denotes a length of the resin molded body 3. For example, T1 and T2 are 1.5 mm, T3 and T5 are 1 mm and T4 are 0.5 mm.

Meanwhile, d denotes a conductor distance between the bus bars $2a$ and $2b$ at both ends of the insert molded product 1 in a length direction (in more detail, a distance along the surface of the insulating resin (creepage distance)). In order to ensure electrical insulation or reliability, the conductor distance d is designed to be a creepage insulation distance which depends on a material or usage environment.

Figure 2A:
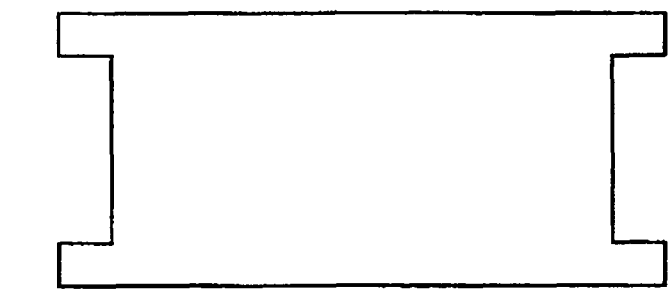
FIGS. 2A and 2B are views showing bus bars used for the insert molded product of FIG. 1.
Figure 2B:
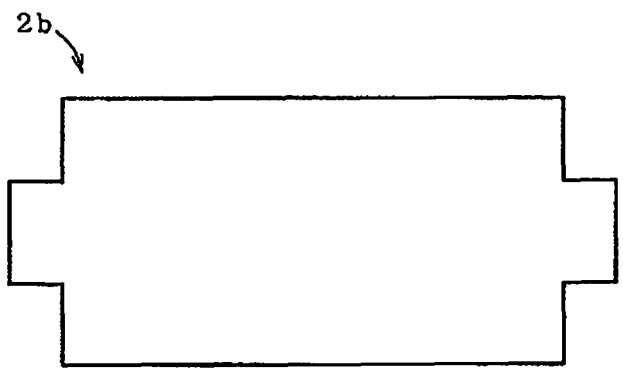

The bus bars $2a$ and $2b$ are exposed at both ends of the resin molded body 3 in a length direction and each of the exposed portions is a connecting terminal. As shown in FIGS. 2A and 2B, the bus bars $2a$ and $2b$ have shapes such that the bus bars $2a$ and $2b$ are arranged alternately at the both ends in a length direction which becomes the connecting terminals when arranged in a laminated manner (the both ends of the bus bar $2a$ in a length direction have a squared U-shape in a plan view and the both ends of the bus bar $2b$ in a length direction have an inverted T-shape in a plan view). The shape is not specifically limited thereto, and the design may be appropriately changed depending on the usage environment.

The resin molded body 3 is collectively molded with the insulating resin in a state that the bus bars $2a$ and $2b$ are separated. The resin molded body 3 is provided to ensure the electric insulation around the bus bars $2a$ and $2b$ and also to ensure the electrical insulation between the bus bars $2a$ and $2b$ while maintaining the separation interval T4 between the bus bars $2a$ and $2b$. As an insulating resin to be a material of the resin molded body 3, it is possible to use, e.g.; PPS (polyphenylene sulfide) resin, PA (polyamide) resin, LCP (liquid crystal polymer) resin or epoxy resin, etc. The material can be appropriately selected depending on a method of molding the resin molded body 3. For example, PPS resin, PA resin and LCP resin, etc., can be used for injection molding, and various epoxy resins, etc., can be used for transfer molding.

Although the details will be described later, a portion which is a junction of the resins filled from two directions, i.e., a weld line, may be formed when the resin molded body 3 is molded by these molding methods. As shown in FIG. 1C, the insert molded product 1 of the first embodiment is configured such that a weld line 4 is formed on the periphery of the bus bars 2a and 2b but not between the bus bars 2a and 2b.

An insert molding method of the insert molded product 1 in the first embodiment will be described.

Firstly, a molding die used in the insert molding method will be described.

Figure 3A:
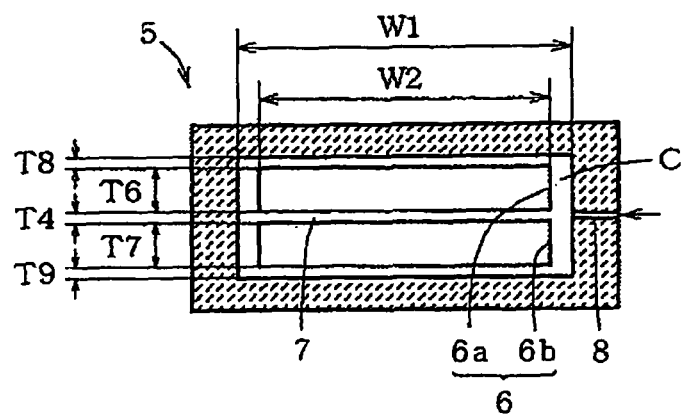
FIG. 3A is a horizontal cross sectional view and FIG. 3B is a vertical cross sectional view.
Figure 3B:
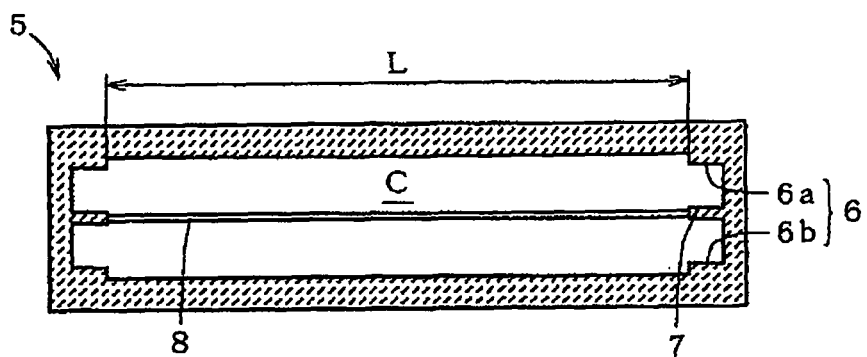

As shown in FIG. 3, the molding die 5 has a cavity C inside thereof for molding the resin molded body 3. A holding groove 6 for holding the both ends of the bus bars 2a and 2b is each formed on the inner wall surfaces of the molding die 5 forming the cavity C which face each other at the both ends of the bus bars 2a and 2b in a length direction. A space-maintaining projection 7 for maintaining the separation interval T4 between the bus bars 2a and 2b to the set interval or more is formed so as to extend from the bottom surface of each holding groove 6, and each of the holding grooves 6 is partitioned into a first holding groove 6a for holding the bus bar 2a and a second holding groove 6b for holding the bus bar 2b. A width T6 of the first holding groove 6a is formed larger than a thickness T1 of the bus bar 2a, and a width T7 of the second holding groove 6b is formed larger than a thickness T2 of the bus bar 2b. As a result, the bus bars 2a and 2b are held in a hollow so as to have some allowance in a lamination direction (a vertical direction in the drawing), and the separation interval T4 thereby freely varies. The upper limits of the widths T6 and T7 of the first holding groove 6a and the second holding groove 6b are determined so that the gaps T3 and T5 between the bus bars 2a, 2b and the inner wall surface of the molding die 5 do not fall below a certain value.

In addition, a gate 8 for filling an insulating resin which is a material of the resin molded body 3 is formed on the inner wall surface of the molding die 5 which faces side portions of the bus bars 2a and 2b in a width direction. The gate 8 is formed in a long film shape so that the opening thereof connects each of the projections 7 along the length direction of the bus bars 2a and 2b. In other words, it is configured that the insulating resin is filled through the gate 8 and it is thereby possible to fill the gap between the bus bars 2a and 2b with the insulating resin.

The shape of the opening of the gate 8 is not limited to the film shape, and it may be, e.g., a circular shape. In addition, the number of the gates 8 may be singular or plural.

Although FIG. 3 is schematically illustrated, the molding die 5 is, e.g., formed to be freely divided or assembled in a vertical direction of the drawing and is configured such that the bus bars 2a and 2b are stored therein.

Next, an insert molding method using the molding die 5 will be described.

Figure 4A:
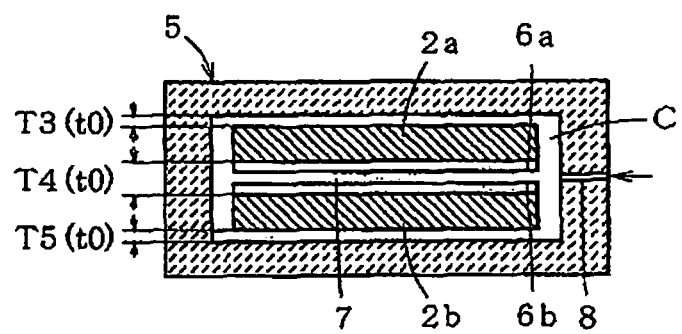
FIG. 4A is a horizontal cross sectional view and FIG. 4B is a vertical cross sectional view.
Figure 4B:
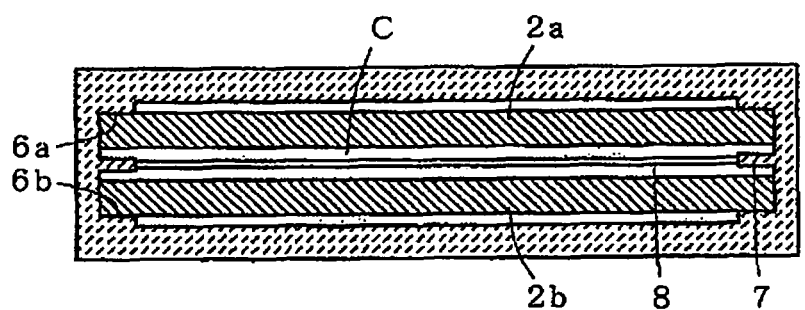

Firstly, the bus bars 2a and 2b are held in a hollow in the molding die 5. At this time, the bus bars 2a and 2b are each held in a hollow while sandwiching the projection 7 so that the separation interval T4 between the bus bars 2a and 2b is larger than the set interval, as shown in FIG. 4. This is because it is easy to fill the gap between the bus bars 2a and 2b with the insulating resin when the separation interval T4 is determined to be larger than the final separation interval T4 as the set interval at the time of filling the insulating resin through the gate 8. Note that, in FIG. 4, T3 (t0) denotes T3 at the time t0, T4 (t0) denotes T4 at the time t0 and T5 (t0) denotes T5 at the time t0 (the time sequentially varies from t0, t1, t2, t3 and to t4).

Figure 5A:
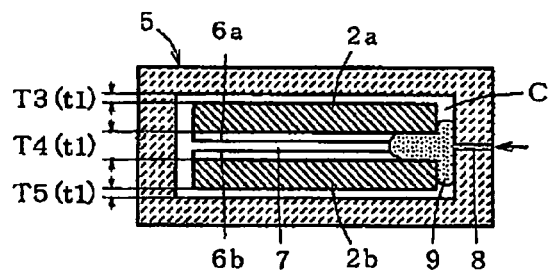
FIGS. 5A to 5D are views showing the state of the filled resin during molding when the molding die of FIG. 3 is used.
Figure 5B:
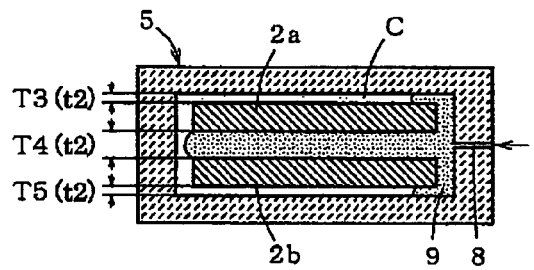
Figure 5C:
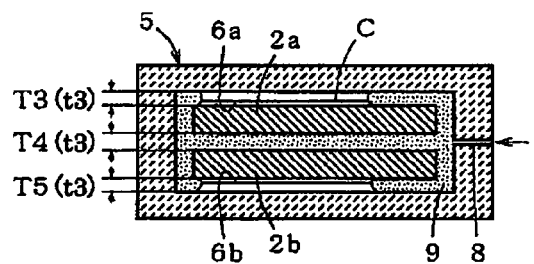

After that, as shown in FIG. 5(a), the gap (inner layer) between the bus bars 2a and 2b which are held in a hollow is filled with an insulating resin 9 through the gate 8. After completion of filling the inner layer with the insulating resin 9 as shown in FIG. 5(b), the insulating resin 9 is subsequently intruded into the inner rim portion (outer layer) of the molding die 5 as shown in FIG. 5(c). In detail, after the gap between the bus bars 2a and 2b is filled with the insulating resin 9, the thickness of the gate 8 or the filling rate of the insulating resin 9 is controlled so that the insulating resin 9 is intruded into the outer layer, and it is thereby possible to fill at first the gap between the bus bars 2a and 2b and then the outer layer with the insulating resin 9. When considering the case where, e.g., the initial separation interval between the bus bars 2a and 2b (T4 (t0)) is the same as the distance from the bus bars 2a, 2b to the inner wall surface of the molding die 5 (T3 (t0), T5 (t0)), the final separation interval T4 between the bus bars 2a and 2b is the largest when starting to fill the outer surface with the insulating resin 9 after the completion of filling the inner layer, and the final separation interval T4 is the smallest when the outer layer is also filled after the start of filling the inner layer and before the completion of filling the inner layer. In addition, a difference between a filling degree of the inner layer and that of the outer layer is larger when the gate 8 is thin. In addition, the faster the filling rate of the insulating resin 9 through the gate 8, the larger the difference between the filling degree of the inner layer and that of the outer layer. In addition, in order to adjust the filling degree of the inner layer and that of the outer layer, it is effective to change the gate location by hydraulic control so as to change the distance between the gate 8 and the bus bars 2a, 2b in accordance with the progress of the filling. The ratio of filling the inner layer increases when the gate location is close to the conductor, and the ratio of filling the outer layer gradually increases with increasing the distance. When the gate 8 is located inner than the end portions of the bus bars 2a and 2b in a width direction, the ratio of filling the inner layer further increases.

It is possible to use injection molding, hot melt molding and transfer molding, etc., for filling with the insulating resin 9.

Figure 5D:
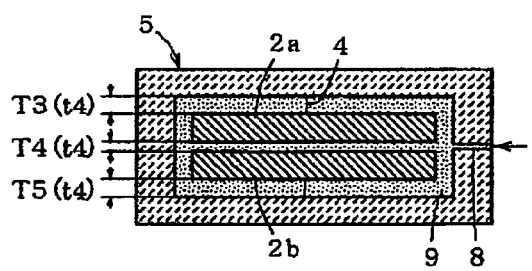
Figure 6:
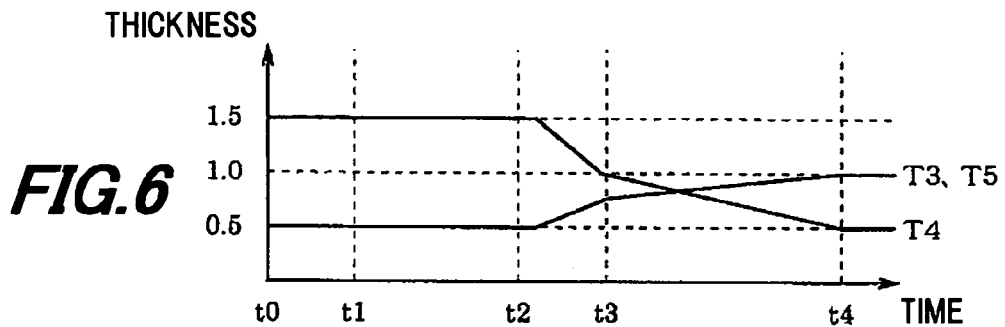
FIG. 6 is a graph showing time variation of thickness of each portion during molding when the molding die of FIG. 3 is used.

When the insulating resin 9 is intruded into the outer layer as described above, since pressure (resin pressure) in a direction that the bus bars 2a and 2b is pressed from the outer layer side to the inner layer side is applied by the intruded insulating resin 9 as shown in FIG. 5(d), the both ends of the bus bars 2a and 2b in the length direction are each pressed against the projection 7. As a result, the separation interval T4 between the bus bars 2a and 2b is narrowed and the final separation interval T4 can be thus reduced less than the initial separation interval T4. For example, as shown in FIG. 6, when the separation interval T4 between the bus bars 2a and 2b at the time of starting to fill with the insulating resin 9 (initial stage) is determined to be 1.5 mm and the thicknesses T3 and T5 of the outer layer are each determined to be 0.5 mm, the final separation interval T4 can be 0.5 mm and the thicknesses T3 and T5 of the outer layer can be 1 mm for each.

Finally, the molded product is demolded from the molding die 5, thereby obtaining the insert molded product 1.

As described above, a portion which is a junction of the insulating resins 9 filled from two directions is called the weld line 4, and in this portion, a gap may be generated between the insulating resins 9 which are combined by heat shrinkage thereof, etc., or an interface which is a defect in electrical insulation may be generated. When the inner layer is filled at first and the outer layer is then filled as is the present invention, the weld line 4 is not generated between the bus bars 2a and 2b and can be formed on the periphery (outer side) of the bus bars 2a and 2b. When voltage is applied between the bus bars 2a and 2b for use, it is desirable that there is no gap or interface between the bus bars 2a and 2b which is a defect in the electrical insulation, and the present invention is excellent in this point.

In sum, in the insert molding method in the first embodiment, the space-maintaining projection 7 for maintaining the separation interval T4 between the bus bars 2a and 2b to the set interval or more is each formed on the inner wall surfaces which each face the both ends of the bus bars 2a and 2b in the length direction, the gate 8 for filling the insulating resin 9 is formed on the inner wall surface which faces the side portions of the bus bars 2a and 2b in the width direction, the bus bars 2a and 2b are held in a hollow in the molding die 5 so that the separation interval T4 freely varies while sandwiching the projection 7 and that the separation interval T4 is wider than the set interval, the gap between the bus bars 2a and 2b which are held in a hollow is filled with the insulating resin 9 through the gate 8, the resin is intruded into the inner rim portion of the molding die 5 and the both ends of the bus bars 2a and 2b are pressed against the projection 7 by the resin pressure of the intruded insulating resin 9, thereby obtaining the insert molded product 1.

Therefore, when filling with the insulating resin 9, the bus bars 2a and 2b freely move over the whole length by the resin pressure thereof. Hence, pressure difference which causes deformation of the bus bars 2a and 2b is not generated at the time of molding, it is possible to suppress the deformation of the bus bars 2a and 2b and to mold in the state that the bus bars 2a and 2b are separated at a set interval over the whole length, and it is thereby possible to obtain the insert molded product 1 which is excellent in the electrical insulation and the reliability.

In the first embodiment, the final separation interval T4 is determined to be 0.5 mm, the thicknesses T3 and T5 of the outer layer are each determined to be 1 mm and it is designed that the inner resin layer formed between the bus bars 2a and 2b is thinner than the outer resin layer formed on the periphery of the bus bars 2a and 2b. However, the outer resin layer which allows a larger insulation distance may be formed to be thinner than the inner resin layer. This configuration allows thinner wall molding.

In this embodiment, the following methods may be used for temporarily holding the bus bars 2a and 2b in the hollow within the molding die 5.

For example, the bus bars 2a and 2b may be held in the hollow by attaching an adhesive member such as a double-stick tape to the holding groove 6 for holding both ends of the bus bars 2a and 2b, and bonding the bus bars 2a and 2b to the adhesive member. In this case, the adhesion force of the adhesive member to the bus bars 2a and 2b is preferably smaller than the pressure (i.e., resin pressure) applied to the bus bars 2a and 2b in the direction of pressing the bus bars 2a and 2b from the outer layer side to the inner layer side when the insulating resin 9 is intruded into the inner rim portion (i.e., outer layer) of the molding die 5.

Alternatively, the bus bars 2a and 2b may be held in the hollow by disposing an inclusion between the bus bars 2a and 2b. The inclusion is preferably melted into the insulating resin 9 due to the temperature of the insulating resin 9 when filled in the molding die 5.

Alternatively, the bus bars 2a and 2b may be held in the hollow by providing a through hole (not shown) for penetrating through the side part (i.e., part located at both ends in the width direction (as the lateral direction in FIG. 3A)) of the molding die 5 in the width direction of the bus bars 2a and 2b, such that a bus bar holding pin (not shown) can be inserted through the through hole to contact the bus bars 2a and 2b.

Alternatively, the bus bars 2a and 2b may be held in the hollow by disposing the molding die 5 such that the opposite side to the side part with the gate 8 formed therein faces downward.

Herein, "a space-maintaining projection for maintaining a separation interval between the plurality of insert members at the preset interval or more" means that, although the present invention is inherently based on the technical idea of changing the spacing between the plural insert members, the insert molding is conducted such that the spacing of the plural insert members are eventually maintained at the preset interval or more. In other words, "a space-maintaining projection for maintaining a separation interval between the plurality of insert members at the preset interval or more" also means a space-controlling projection for controlling the spacing of the plural insert members not to be less than the preset interval.

Second Embodiment

With a Supporting Member Near the Center

The insert molding method in the second embodiment is different from that in the first embodiment in that a supporting member 10 which contacts with the bus bars 2a and 2b along the length direction is inserted into the molding die 5, and then, the supporting member 10 is separated from the bus bars 2a and 2b so as not to disturb the intrusion of the insulating resin 9 when the insulating resin 9 is intruded into the inner rim portion of the molding die 5.

The reason for inserting the supporting member 10 into the molding die 5 will be described below.

Figure 7:
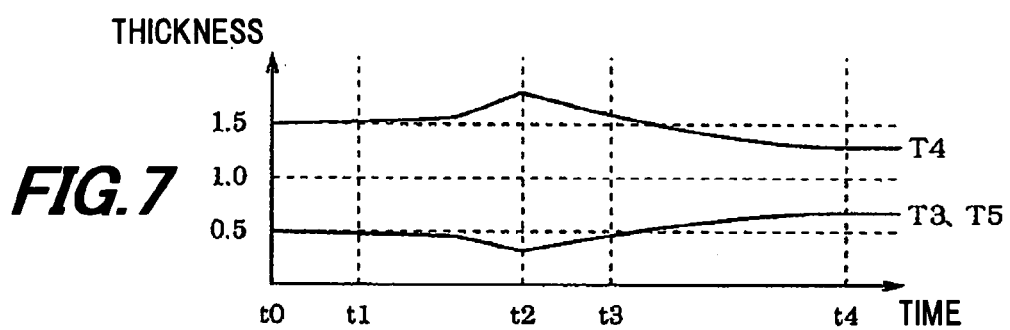
FIG. 7 is a graph showing time variation of thickness of each portion during molding when the molding die of FIG. 3 and long bus bars are used.
Figure 8A:
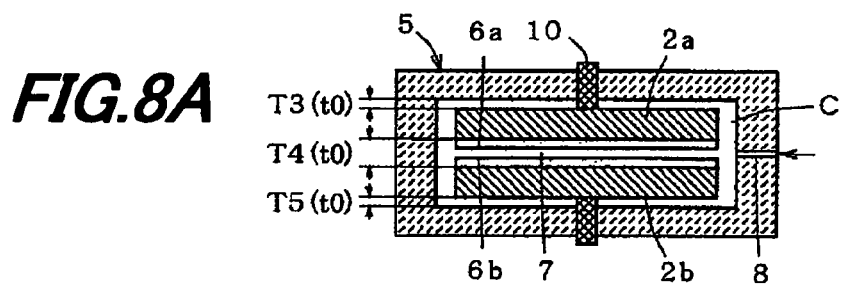
FIG. 8A is a horizontal cross sectional view and FIG. 8B is a vertical cross sectional view.
Figure 8B:
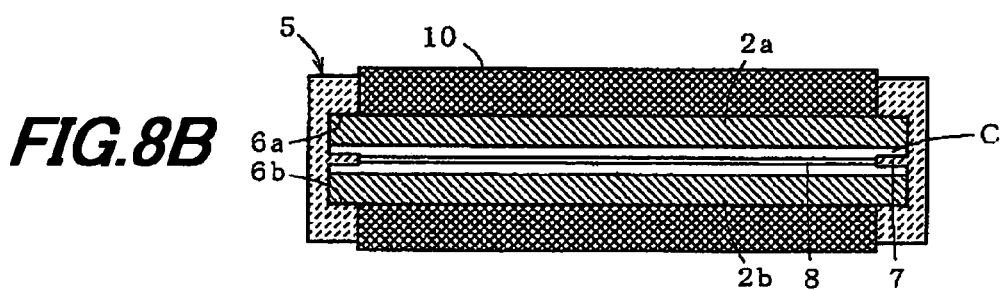
Figure 9A:
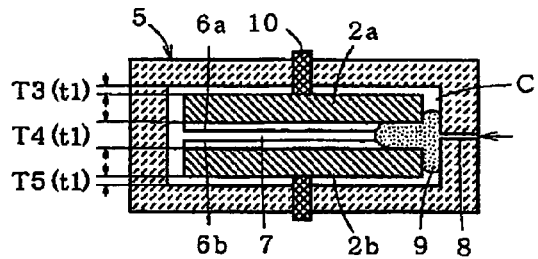
FIGS. 9A to 9D are views showing the state of the filled resin and an operation of a supporting member during molding when the molding die of FIG. 8 is used.
Figure 9B:
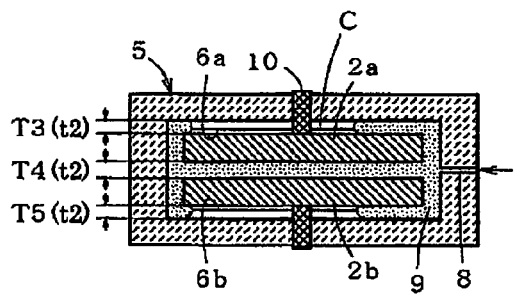
Figure 9C:
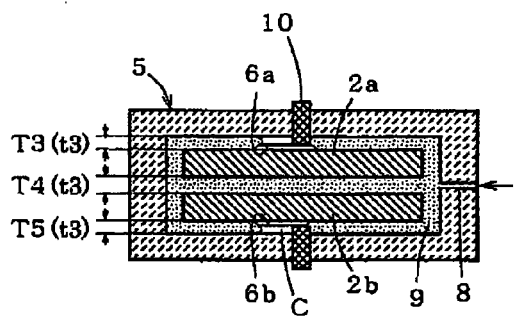
Figure 9D:
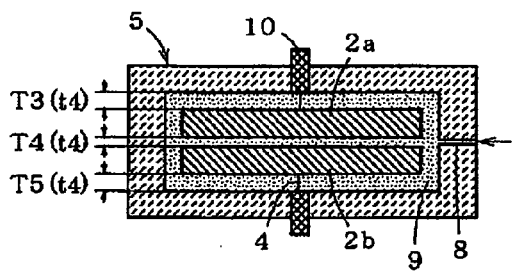

The both ends of the bus bars 2a and 2b in a y-axis direction (length direction) are restricted by the holding groove 6 so that the separation interval T4 between the bus bars 2a and 2b is not extended more than a certain length (T6+T4+T7−(T1+T2)) and that the distances T3 and T5 from the bus bars 2a, 2b to the inner wall surface of the molding die 5 does not fall below the certain length (T8, T9), however, the bus bars 2a and 2b may be deflected when a length L of the resin molded body 3 (a length of a portion of the bus bars 2a and 2b which are arranged in the cavity C) is longer than the thicknesses T1 and T2 of the bus bars 2a and 2b, which may results in that the separation interval T4 between the bus bars 2a and 2b is increased and the distances T3 and T5 from the bus bars 2a, 2b to the inner wall surface of the molding die 5 are narrowed. When the distances T3 and T5 from the bus bars 2a, 2b to the inner wall surface of the molding die 5 are narrow, there is a possibility that the final separation interval T4 between the bus bars 2a and 2b is increased and that the resin layer on the periphery of the bus bars 2a and 2b becomes thin, as shown in FIG. 7. This is because the force in a direction to extend the separation interval T4 between the bus bars 2a and 2b is applied by the resin pressure between the bus bars 2a and 2b, and as shown in FIG. 8, the phenomenon in which the insulating resin 9 is present only in the gap between the bus bars 2a and 2b can be suppressed by pressing the bus bars 2a and 2b from the outside by the supporting member 10 at the vicinity of the center in an x-axis direction (width direction). Even if the length of the supporting member 10 in the y-axis direction is shorter than those of the bus bars 2a and 2b, the effect of preventing the separation interval T4 between the bus bars 2a and 2b from being extended can be expected.

Figure 10:
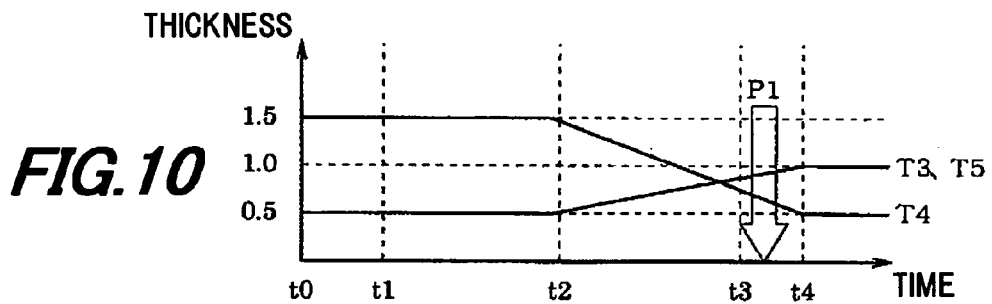
FIG. 10 is a graph showing time variation of thickness of each portion during molding when the molding die of FIG. 8 is used.

Regarding a specific operation, as shown in FIGS. 9 and 10, when the supporting member 10 is withdrawn into the molding die 5 (separated from the bus bars 2a and 2b) by the hydraulic control at a point P1 at which the insulating resin 9 is intruded around the opposite side of the gate 8 and reaches the outer layer in the vicinity of the supporting member 10, the portion of the bus bars 2a and 2b into which the supporting member 10 is inserted can be covered with the insulating resin 9.

As described above, according to the insert molding method in the second embodiment, even when the bus bars 2a and 2b of which lengths are larger than the thicknesses thereof and which are apt to deflect are used, the deformation of the bus bars 2a and 2b at the time of molding can be suppressed, it is possible to mold in the state that the bus bars 2a and 2b are separated at the set interval, and it is thus possible to obtain the insert molded product 1 which is excellent in the electrical insulation and the reliability.

Third Embodiment

With the Supporting Member on the Gate Side

The insert molding method in the third embodiment is different from that in the second embodiment in the position into which the supporting member 10 is inserted. That is, the supporting member 10 is inserted on the gate side in the third embodiment. The reason therefor will be described below.

Figure 11A:
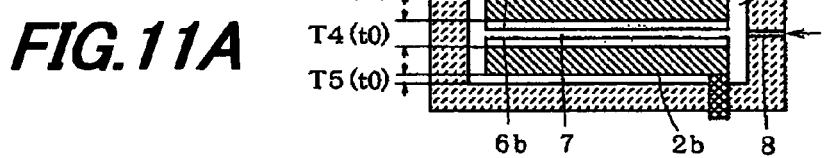
FIG. 11A is a horizontal cross sectional view and FIG. 11B is a vertical cross sectional view.
Figure 11B:
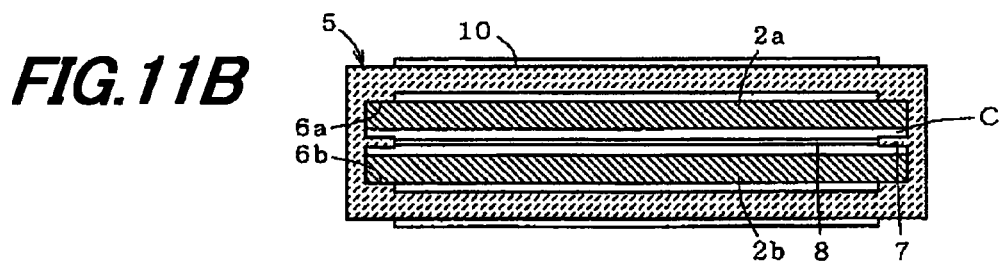
Figure 12A:
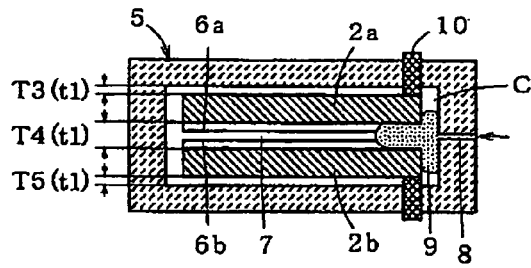
FIGS. 12A to 12D are views showing the state of the filled resin and an operation of a supporting member during molding when the molding die of FIG. 11 is used.
Figure 12B:
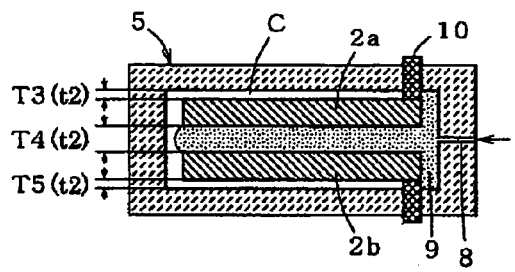
Figure 12C:
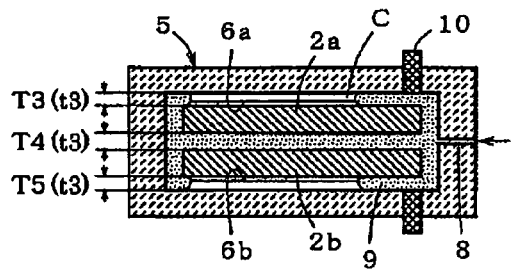
Figure 12D:
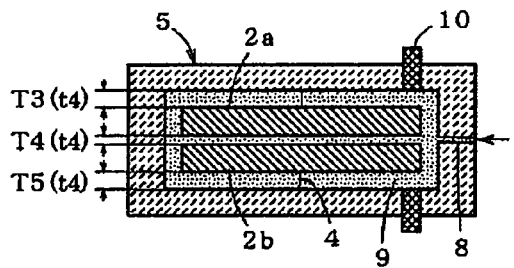

If the insulating resin 9 is poured into the outer layer on the gate 8 side in the state that the small amount of the insulating resin 9 is poured into the inner layer, the force in a direction to narrow the separation interval T4 between the bus bars 2a and 2b acts due to the pressure of the insulating resin 9 of the outer layer, and it becomes difficult to pour the insulating resin 9 into the gap between the bus bars 2a and 2b. Such a phenomenon can be avoided by using the molding die 5 as shown in FIG. 11, where the bus bars 2a and 2b are pressed from the outside by the supporting member 10 on a side close to the gate 8. The supporting member 10 has a larger effect of suppressing the intrusion of the insulating resin 9 into the outer layer if the supporting member 10 has a length over the whole length of the bus bars 2a and 2b in the y-axis direction. From the above-mentioned reason, the supporting member 10 is inserted on the gate side in the third embodiment.

Figure 13:
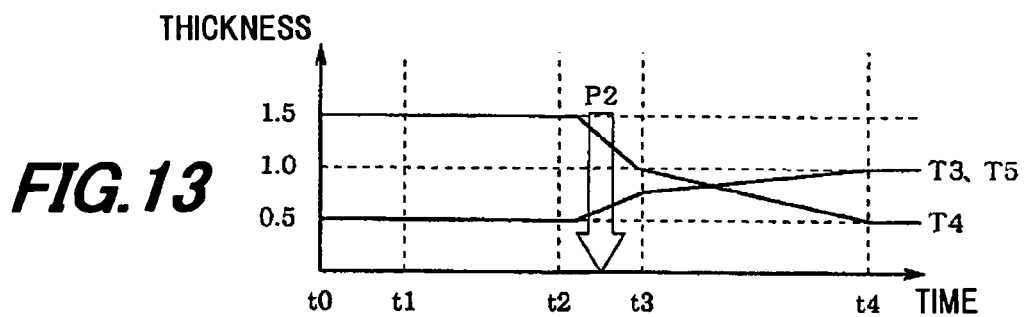
FIG. 13 is a graph showing time variation of thickness of each portion during molding when the molding die of FIG. 11 is used.

Regarding a specific operation, as shown in FIGS. 12 and 13, when the supporting member 10 is withdrawn into the molding die 5 (separated from the bus bars 2a and 2b) by the hydraulic control at a point P2 at which the insulating resin 9 proceeds to a certain level, the portion of the bus bars 2a and 2b into which the supporting member 10 is inserted can be covered with the insulating resin 9.

As described above, according to the insert molding method in the third embodiment, even if the gap between the bus bars 2a and 2b is narrow, it is possible to prevent the insulating resin 9 from being poured into the outer layer at the time of starting the filling, and it is possible to facilitate to fill the gap between the bus bars 2a and 2b with the insulating resin 9. In addition, in the same manner as the insert molding method in the first embodiment, the deformation of the bus bars 2a and 2b at the time of molding can be suppressed, it is possible to mold in the state that the bus bars 2a and 2b are separated at the set interval, and it is thus possible to obtain the insert molded product 1 which is excellent in the electrical insulation and the reliability.

Fourth Embodiment

With the Supporting Member Near the Center and on the Gate Side

Figure 14A:
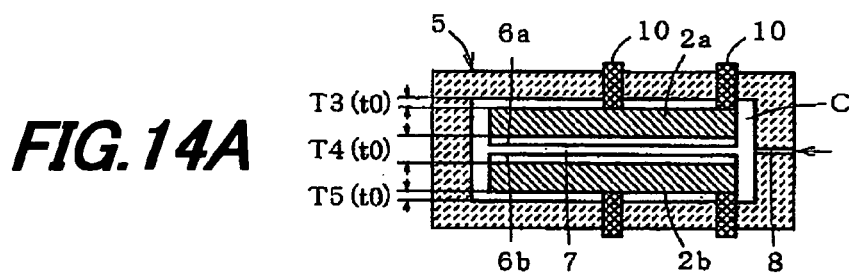
FIG. 14A is a horizontal cross sectional view and FIG. 14B is a vertical cross sectional view.
Figure 14B:
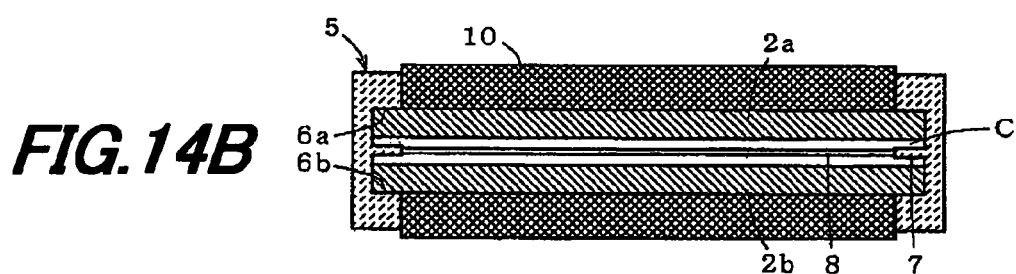
Figure 15A:
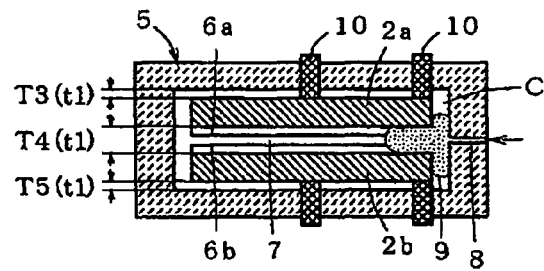
FIGS. 15A to 15D are views showing the state of the filled resin and an operation of a supporting member during molding when the molding die of FIG. 14 is used.
Figure 15B:
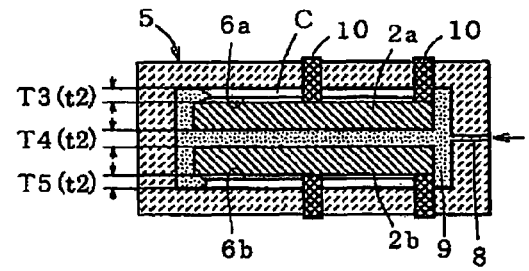
Figure 15C:
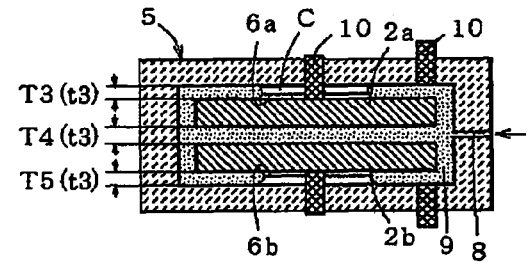
Figure 15D:
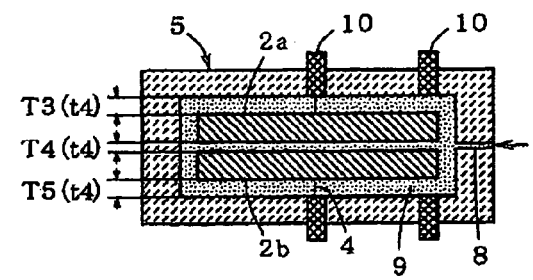

As shown in FIG. 14, the insert molding method in the fourth embodiment is a method which is a combination of the insert molding method in the second embodiment and that in the third embodiment.

Figure 16:
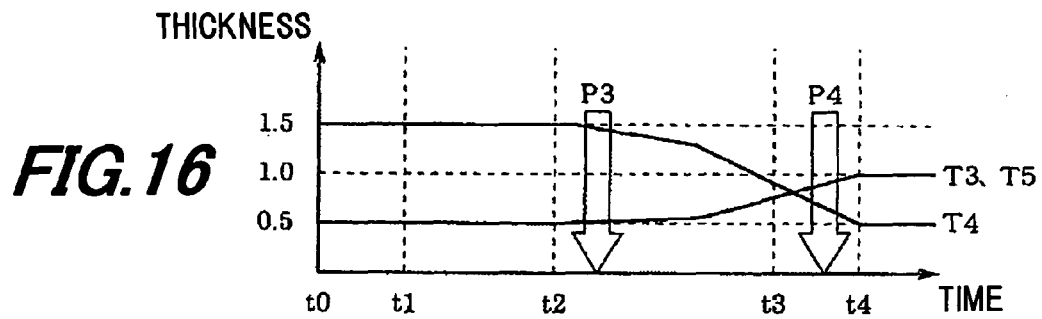
FIG. 16 is a graph showing time variation of thickness of each portion during molding when the molding die of FIG. 14 is used.

Regarding a specific operation, as shown in FIGS. 15 and 16, when the supporting member 10 on the gate side is withdrawn into the molding die 5 (separated from the bus bars 2a and 2b) by the hydraulic control at a point P3 at which the insulating resin 9 proceeds to a certain level, the portion of the bus bars 2a and 2b into which the supporting member 10 is inserted can be covered with the insulating resin 9. Furthermore, when the supporting member 10 in the vicinity of the center is withdrawn into the molding die 5 (separated from the bus bars 2a and 2b) by the hydraulic control at a point P4 at which the insulating resin 9 is intruded around the opposite side of the gate 8 and reaches the outer layer in the vicinity of the supporting member 10, the portion of the bus bars 2a and 2b into which the supporting member 10 is inserted can be covered with the insulating resin 9.

As described above, according to the insert molding method in the fourth embodiment, even when the bus bars 2a and 2b of which lengths are larger than the thicknesses thereof and which are apt to deflect are used, the deformation of the bus bars 2a and 2b at the time of molding can be suppressed, it is possible to mold in the state that the bus bars 2a and 2b are separated at the set interval, and it is thus possible to obtain the insert molded product 1 which is excellent in the electrical insulation and the reliability.

In addition, even if the gap between the bus bars 2a and 2b is narrow, it is possible to prevent the insulating resin 9 from being poured into the outer layer at the time of starting the filling, and it is possible to facilitate to fill the gap between the bus bars 2a and 2b with the insulating resin 9.

Fifth Embodiment

With a Push Bar from Outside

The insert molding method in the fifth embodiment is different from that in the first embodiment in that a push bar 11 in contact with the bus bars 2a and 2b is inserted into the molding die 5 and is then pushed in so as to supplement the resin pressure to reduce the separation interval T4 between the bus bars 2a and 2b when the insulating resin 9 is intruded into the inner rim portion of the molding die 5.

The reason for inserting the push bar 11 into the molding die 5 and the operation thereof will be described below.

Figure 17A:
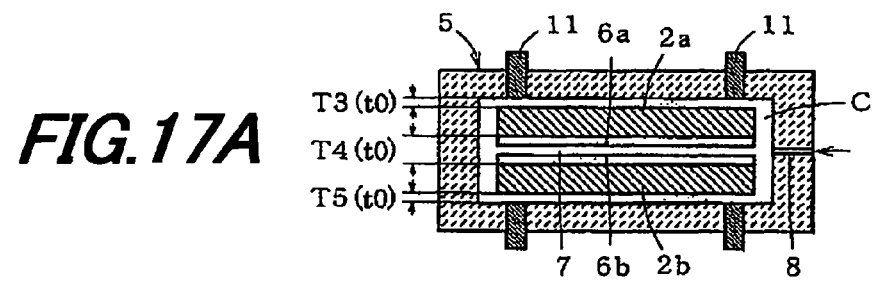
FIG. 17A is a horizontal cross sectional view and FIG. 17B is a vertical cross sectional view.
Figure 17B:
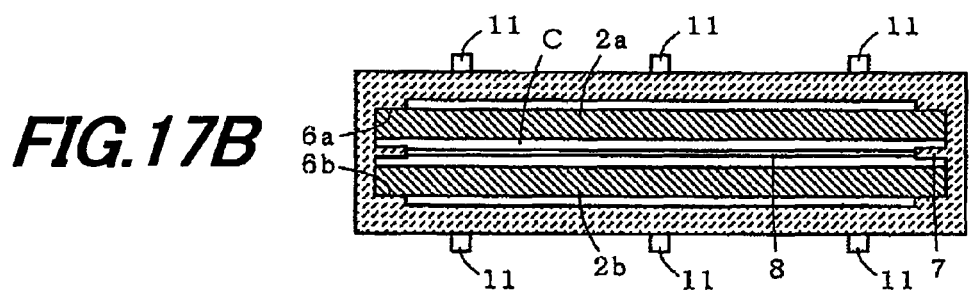
Figure 18A:
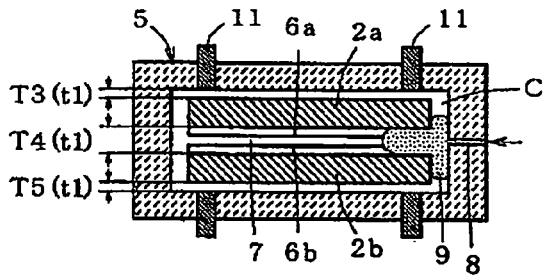
FIGS. 18A to 18D are views showing the state of the filled resin and an operation of a push bar during molding when the molding die of FIG. 17 is used.
Figure 18B:
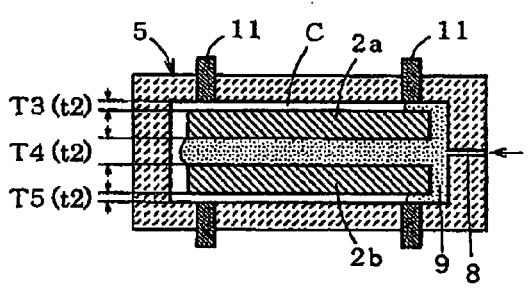
Figure 18C:
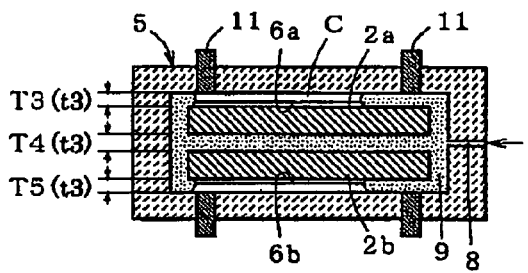
Figure 18D:
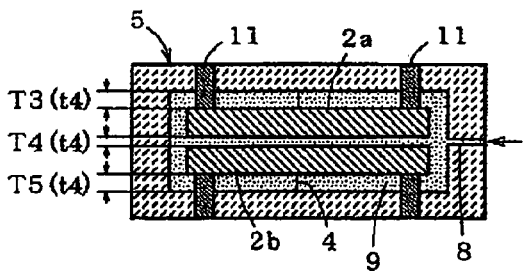
Figure 19:
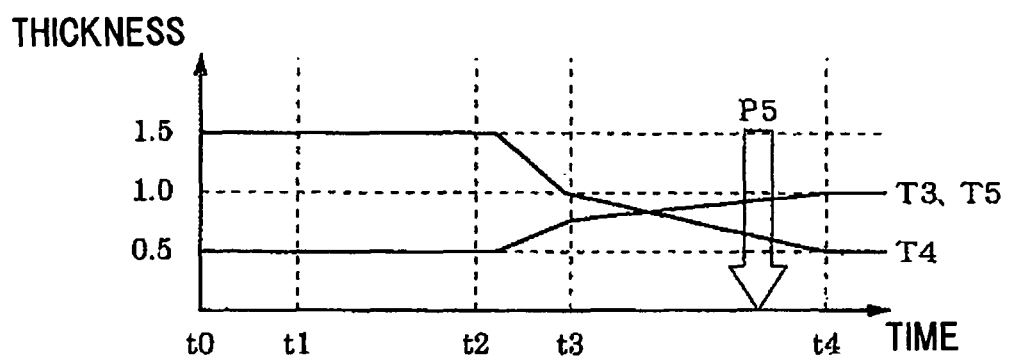
FIG. 19 is a graph showing time variation of thickness of each portion during molding when the molding die of FIG. 17 is used.
Figure 20A:
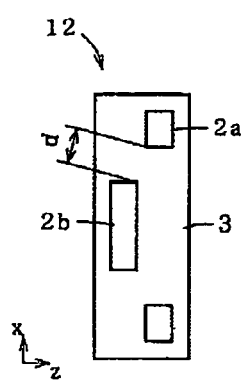
FIG. 20A is a side view.
Figure 20B:
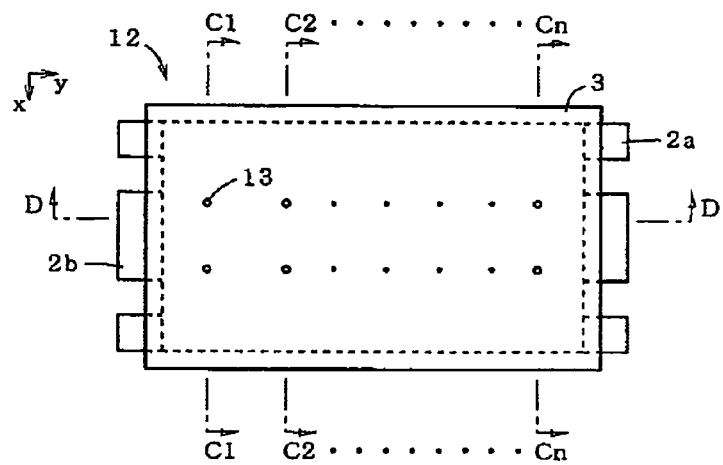
FIG. 20B is a plan view.
Figure 20C:
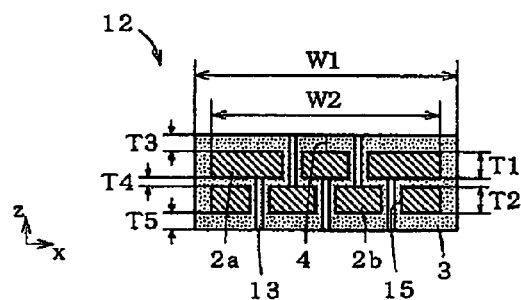
Figure 20D:
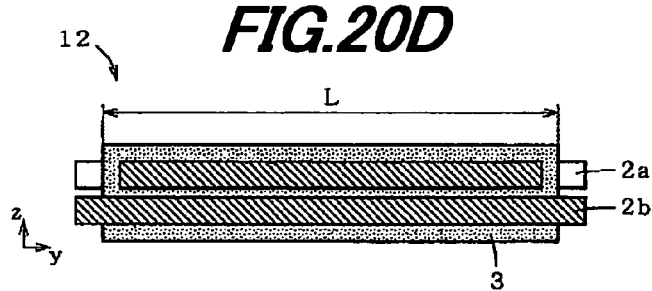

It may not be possible to reduce the separation interval T4 between the bus bars 2a and 2b to the set interval when the resin pressure from the outside is insufficient. In such as case, by inserting the push bar 11 for pushing the bus bars 2a and 2b from the outside into the molding die 5 and then pushing the push bar 11 by the hydraulic control at a point P5 at which the insulating resin 9 is intruded into the outer layer as shown in FIGS. 17-19, the separation interval T4 between the bus bars 2a and 2b can be reduced to the set interval. It should be noted that the number of push bars 11 which are inserted in the x-axis direction is not limited to two pieces as is shown in FIGS. 17 and 18, and can be appropriately selected.

As described above, according to the insert molding method in the fifth embodiment, even if the resin pressure from the outside is insufficient, it is possible to reduce the separation interval T4 between the bus bars 2a and 2b to the set interval. In addition, in the same manner as the insert molding method in the first embodiment, the deformation of the bus bars 2a and 2b at the time of molding can be suppressed, it is possible to mold in the state that the bus bars 2a and 2b are separated at the set interval, and it is thus possible to obtain the insert molded product 1 which is excellent in the electrical insulation and the reliability.

Sixth Embodiment

Additional Means for Internally Supporting the Separation Interval Between Bus Bars The insert molding method in the sixth embodiment is different from that in the first embodiment in that an approach preventing means is provided in the molding die 5 to prevent the separation interval T4 between the bus bars 2a and 2b over the whole length in the length direction from being less than the set interval. An insert molded product 12 in this case has plural holes 13 formed on upper and lower surfaces thereof, as shown in FIG. 20. The detail of the hole 13 will be described later.

The approach preventing means is to prevent the final separation interval T4 over the whole length of the bus bars 2a and 2b in the length direction from being less than the set interval when the separation interval T4 over the whole length of the bus bars 2a and 2b is reduced by the pressure of the resin outside of the bus bars 2a and 2b.

Figure 21A:
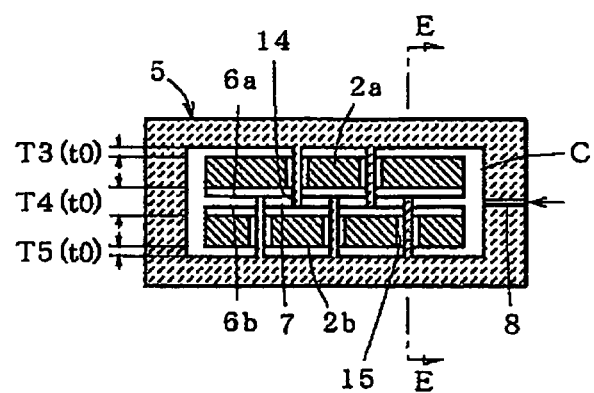
FIG. 21A is a horizontal cross sectional view and FIG. 21B is a vertical cross sectional view.
Figure 21B:
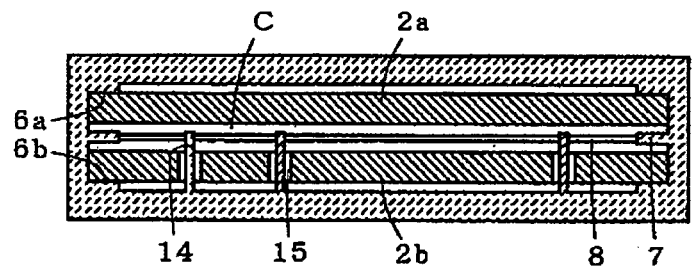
Figure 22A:
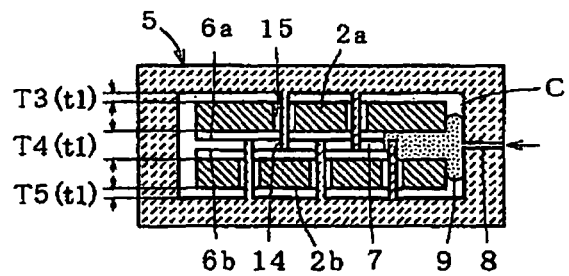
FIGS. 22A to 22D are views showing the state of the filled resin during molding when the molding die of FIG. 21 is used.
Figure 22B:
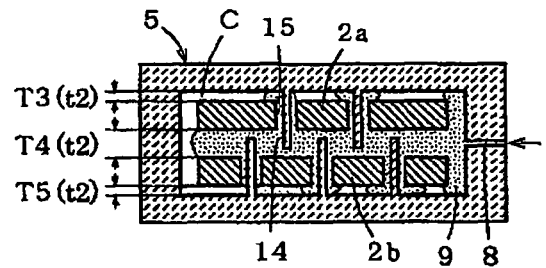
Figure 22C:
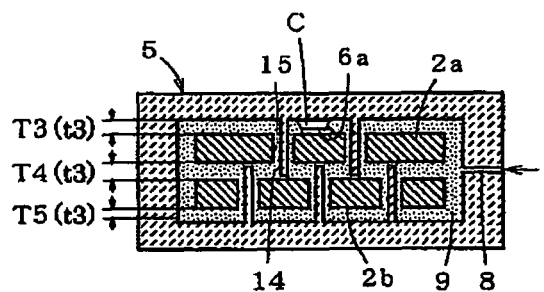
Figure 22D:
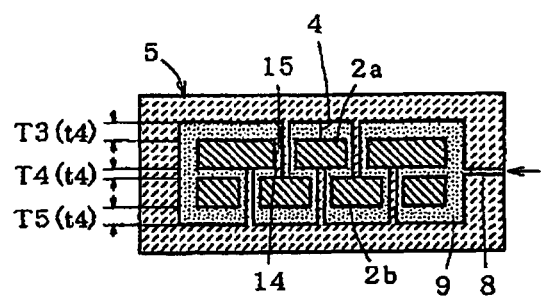

As shown in FIG. 21, the approach preventing means is integrally formed with the inner wall surface of the molding die 5 which faces a surface of the bus bar 2a (2b) opposite to the surface thereof facing the other bus bar 2b (2a), and is composed of plural approach prevention pins 14 which are in contact with the opposite surface of the bus bar 2a (2b) held in a hollow.

Meanwhile, the portion of each of the bus bars 2a and 2b which is in contact with the top surface of the approach prevention pin 14 is exposed after the molding since the insulating resin 9 is not molded. From the viewpoint of ensuring the insulation properties, a gap between the exposed portions, i.e., each gap between the exposed portion of the bus bar 2a and that of the bus bar 2b should be designed so that the distance of the aforementioned gap along the surface of the insulating resin 9 is more than the creepage insulation distance which depends on the material or usage environment.

The approach prevention pin 14 is either fixed in or movably inserted into the molding die 5. It is possible to hold the bus bars having various thicknesses so as to be separated at the set interval by making the approach prevention pin 14 movable in the axis direction thereof, thereby improving general versatility of the molding die 5. In the sixth embodiment, the approach prevention pin 14 is integrally fixed to the molding die 5.

In addition, a pin hole 15 is formed in the bus bar 2a (2b) in order to insert and let through the approach prevention pin 14 which is in contact with the other bus bar 2b (2a). The inner diameter of the pin hole 15 is formed larger than the outer diameter of the approach prevention pin 14, and the inner surface of the pin hole 15 can be covered by the insulating resin 9 which has a thickness larger than the separation interval T4 between the bus bars 2a and 2b if the difference between the outer diameter of the approach prevention pin 14 and the inner diameter of the pin hole 15 is determined to be more than double of the separation interval T4 between the bus bars 2a and 2b. The electrical insulation can be better than that of the bus bars 2a and 2b by configuring as described above. In addition, since the thickness of the insulating resin 9 inside the pin hole 15 is configured to be the same as the separation interval T4 between the bus bars 2a and 2b, it is possible to have the electrical insulation without excess or deficiency, to optimize the used amount of the insulating resin 9, and to have the requisite minimum hole diameter with respect to the outer diameter of the approach prevention pin 14.

Figure 23:
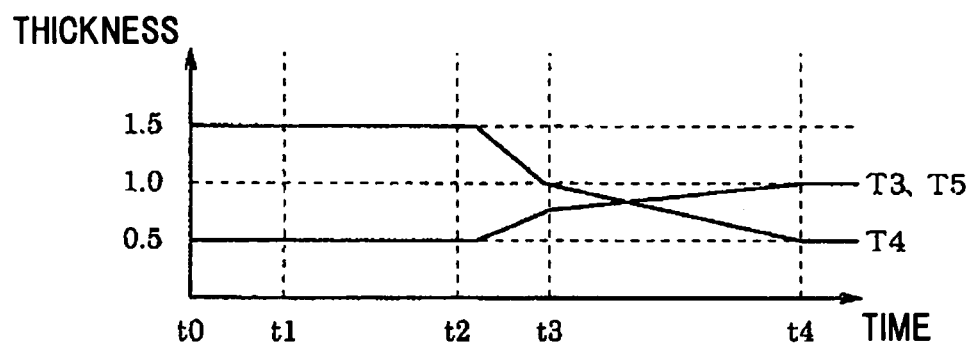
FIG. 23 is a graph showing time variation of thickness of each portion during molding when the molding die of FIG. 21 is used.

By providing the approach preventing means in the molding die 5 as described above, the deformation is restricted by the approach prevention pin 14 over the whole length of the bus bars 2a and 2b in the length direction as shown in FIGS. 22 and 23, and the separation interval T4 between the bus bars 2a and 2b is thus maintained to the set interval. In addition, the insulating resin 9 is intruded into the gap between the approach prevention pin 14 and the pin hole 15, which allows to ensure sufficient electrical insulation even between the pin holes 15 of each bus bar 2a and 2b. Note that, even though two each of the approach prevention pin 14 and the pin hole 15 are illustrated on the left and one each thereof on the right in FIG. 21B, there are, of course, the approach prevention pin 14 and the pin hole 15 between the second left approach prevention pin 14 and pin hole 15 and the right approach prevention pin 14 and pin hole 15, which are omitted in the drawing.

In the sixth embodiment, it is considered that, unlike the first embodiment, the time in which T3 and T5 are increased and the time in which T4 is reduced are slightly shortened since the insulating resin 9 leaks and is poured through the pin hole 15 into the periphery of the bus bars 2a and 2b. However, since the area of the pin hole 15 is enough smaller than the surface area of the bus bars 2a and 2b, the amount of the resin which is intruded around the bus bars 2a and 2b is small and thin-wall moldability is less affected.

As described above, the hole 13 formed in the resin molded body 3 is formed at the time of molding the resin molded body 3 by the approach prevention pin 14 which maintains the separation interval T4 between the bus bars 2a and 2b. It is possible not to leave the hole 13 in the completed product by movably inserting the approach prevention pin 14 into the pin hole 15 and gradually pulling off the approach prevention pin 14 (core-back) as the insulating resin 9 is cured at the time of molding the resin molded body 3. By configuring as described above, i.e., by configuring the bus bars 2a and 2b not to expose from the hole 13, it is possible to further improve the electrical insulation.

Even when the bus bars 2a and 2b are not exposed from the hole 13 as described above, molding conditions such as temperature or pressure may be different between the insulating resin 9 filled into the portion where the approach prevention pin 14 is inserted and the insulating resin 9 filled therearound. In this case, there is a risk that electrical insulating strength of the interface between the insulating resin 9 filled into the portion where the approach prevention pin 14 is inserted and the insulating resin 9 filled therearound is lower than that of the insulating resin 9. However, as described above, if the approach prevention pin 14 is designed so that a gap between the portions thereof in contact with the bus bars 2a and 2b is more than the creepage insulation distance of the insulating resin 9, it is possible to avoid the influence of the low electrical insulating strength of the interface between the insulating resins 9.

As described above, according to the insert molding method in the sixth embodiment, even when the bus bars 2a and 2b of which lengths are larger than the thickness thereof and which are apt to deflect are used, the deformation of the bus bars 2a and 2b at the time of molding can be suppressed, it is possible to mold in the state that the bus bars 2a and 2b are separated at the set interval, and it is thus possible to obtain the insert molded product 1 which is excellent in the electrical insulation and the reliability.

Seventh Embodiment

With Both of the Approach Preventing Means and the Push Bar

The insert molding method in the seventh embodiment is a method which is a combination of the insert molding method in the fifth embodiment and that in the sixth embodiment. Also, according to this insert molding method, even if the resin pressure from the outside is insufficient, it is possible to reduce the separation interval T4 between the bus bars 2*a* and 2*b* to the set interval. In addition, even when the bus bars 2*a* and 2*b* of which lengths are larger than the thickness thereof and which are apt to deflect are used, the deformation of the bus bars 2*a* and 2*b* at the time of molding can be suppressed, it is possible to mold in the state that the bus bars 2*a* and 2*b* are separated at the set interval, and it is thus possible to obtain the insert molded product 1 which is excellent in the electrical insulation and the reliability.

The present invention is not intended to be limited to the above-mentioned embodiments, and the various kinds of changes can be implemented without departing from the gist of the present invention.

The case where two bus bars to be inserted are used has been exemplary described in the above-mentioned embodiment, the present invention can be applied to the case where three or more bus bars are used.

In addition, although the bus bar is used as an insert member in the above-mentioned embodiment, the present invention can be applied as long as the separation interval between the insert members is configured to be narrow.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insert molding method, comprising:
   holding a plurality of insert members in a molding die to be separated from one another; and
   subsequently filling a resin into the molding die to fill a gap between the plurality of insert members and a periphery thereof with the resin to form an insert molded product such that the plurality of insert members are separated at a preset interval from one another,
   wherein the molding die comprises a space-maintaining projection for maintaining a separation interval between the plurality of insert members at the preset interval or more, the projection being formed on an inner wall surface of the molding die opposite to a longitudinal end of the plurality of insert members, and a gate for filling the resin therethrough into the molding die, the gate being formed on an inner wall surface of the molding die opposite to a side of the plurality of insert members in a width direction thereof,
   wherein the plurality of insert members are held in the molding die such that the separation interval is allowed to change and to be more than the preset interval while sandwiching the projection,
   wherein the resin is filled through the gate into the gap between the plurality of insert members such that the resin subsequently penetrates into an inner rim portion of the molding die, and the end of the plurality of insert members is pressed against the projection by resin pressure of the penetrating resin to form the insert molded product; and
   wherein the molding die further comprises a push bar to be inserted into the molding die to contact the plurality of insert members, and
   the push bar is pushed in so as to supplement the resin pressure for reducing the gap between the plurality of insert members when the resin penetrates into the inner rim portion of the molding die.

2. The insert molding method according to claim 1, wherein the molding die further comprises a wide holding groove for holding the plurality of insert members on the inner wall surface, and
   the projection is formed near a center of a bottom of the holding groove.

3. The insert molding method according to claim 1, wherein the molding die further comprises a supporting member to contact the plurality of insert members along a length direction thereof while being inserted into the molding die, and
   the supporting member is separated from the plurality of insert members and does not disturb the penetration of the resin when the resin penetrates into the inner rim portion of the molding die.

4. The insert molding method according to claim 1, wherein the molding die further comprises an approach preventing means to prevent an interval between the plurality of insert members along a length direction thereof from being less than the preset interval.

* * * * *